US012803473B2

(12) United States Patent
Millett

(10) Patent No.: US 12,803,473 B2
(45) Date of Patent: Nov. 17, 2026

(54) MULTIPLE DRIVE SYSTEM FOR REGENERATIVE ENERGY MANAGEMENT IN AN ELEVATOR INSTALLATION

(71) Applicant: OTIS ELEVATOR COMPANY, Farmington, CT (US)

(72) Inventor: Steven Michael Millett, Plainville, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1038 days.

(21) Appl. No.: 17/901,933

(22) Filed: Sep. 2, 2022

(65) Prior Publication Data

US 2024/0079974 A1 Mar. 7, 2024

(51) Int. Cl.
*B66B 11/04* (2006.01)
*H02P 3/14* (2006.01)

(52) U.S. Cl.
CPC .............. *H02P 3/14* (2013.01); *B66B 11/043* (2013.01)

(58) Field of Classification Search
CPC ........... H02P 3/14; H02P 27/04; B66B 1/302; H02K 7/18
USPC .......................................................... 187/289
See application file for complete search history.

(56) References Cited

U.S. PATENT DOCUMENTS

2008/0283341 A1* 11/2008 Aulanko ................. B66B 1/308 187/277
2009/0218175 A1* 9/2009 Wesson ................... B66B 1/302 187/289

OTHER PUBLICATIONS

Du et al. (CN 110441631 A) Potential Can Recycle and Use The Energy Storage Device Test System and Method (Year: 2019).*
Seo Jae-jin (KR 102252799 B1). Power Conversion System and Energy Storage System for Charging or Discharging Energy Ouput From Power Plant (Year: 2021).*
Muraoka (CN 102101615 B) Elevator System (Year: 2013).*
Veronesi et al. (WO 2010042118 A1). Building With Multiple Power Generation Sources Enabled by an Elevator System (Year: 2010).*

* cited by examiner

*Primary Examiner* — Jorge L Carrasquillo
(74) *Attorney, Agent, or Firm* — Carlson, Gaskey & Olds, P.C.

(57) ABSTRACT

An elevator energy management system includes a first variable frequency drive configured to deliver electrical power from a power source to an elevator machine during a first operating condition and to receive regenerative energy from the elevator machine during a second operating condition. A second variable frequency drive is configured to selectively receive regenerative energy from the first variable frequency drive during the second operating condition. At least one energy receiving device is coupled with the second variable frequency drive. The energy receiving device is configured to receive regenerative energy from the second variable frequency drive.

24 Claims, 3 Drawing Sheets

MULTIPLE DRIVE SYSTEM FOR REGENERATIVE ENERGY MANAGEMENT IN AN ELEVATOR INSTALLATION

BACKGROUND

Elevator systems typically include a car that moves vertically between different levels in a building. An elevator machine consumes electrical power to propel the elevator car under certain circumstances. Sometimes the desired movement of the elevator car can be accomplished using gravity and the elevator machine can operate as a generator providing regenerative electrical power.

While regenerative electrical power is considered desirable to reduce energy consumption, the resulting energy has to be consumed or stored. One approach includes adding large resistor load banks to the power lines to absorb excess energy. Adding such resistors introduces additional cost and results in absorbing more energy than necessary, which is considered wasteful.

SUMMARY

An illustrative example embodiment of an elevator energy management system includes a first variable frequency drive configured to deliver electrical power from a power source to an elevator machine during a first operating condition and to receive regenerative energy from the elevator machine during a second operating condition. A second variable frequency drive is configured to selectively receive regenerative energy from the first variable frequency drive during the second operating condition. At least one energy receiving device is coupled with the second variable frequency drive. The energy receiving device is configured to receive regenerative energy from the second variable frequency drive.

In addition to one or more of the features described above, or as an alternative, the second variable frequency drive is configured to communicate with the first variable frequency drive to receive an indication of at least an amount of regenerative energy received by the first variable frequency drive or an amount of regenerative energy to be received by the second variable frequency drive during the second operating condition.

In addition to one or more of the features described above, or as an alternative, the amount of regenerative energy to be received by the second variable frequency drive is less than the amount of regenerative energy received by the first variable frequency drive.

In addition to one or more of the features described above, or as an alternative, the second variable frequency drive controls an amount of regenerative power received by the second variable frequency drive according to the indication of the amount of regenerative energy to be received by the second variable frequency drive.

In addition to one or more of the features described above, or as an alternative, the second variable frequency drive is configured to determine an amount of regenerative energy to be received from the first variable frequency drive during the second operating condition.

In addition to one or more of the features described above, or as an alternative, the at least one energy receiving device comprises an energy storage device configured to receive regenerative energy from the second variable frequency drive.

In addition to one or more of the features described above, or as an alternative, the energy storage device comprises a battery.

In addition to one or more of the features described above, or as an alternative, the energy storage device comprises a flywheel.

In addition to one or more of the features described above, or as an alternative, the at least one energy receiving device comprises at least one energy dissipation component.

In addition to one or more of the features described above, or as an alternative, the at least one energy dissipation component comprises a resistive load.

An illustrative example embodiment of a method of managing energy in an elevator system includes: delivering electrical power from a power source to an elevator machine through a first variable frequency drive during a first operating condition, receiving regenerative energy from the elevator machine at the first variable frequency drive during a second operating condition, receiving at least some of the regenerative energy from the first variable frequency drive at a second variable frequency drive during the second operating condition, and delivering regenerative energy received by the second variable frequency drive to at least one energy receiving device coupled with the second variable frequency drive.

In addition to one or more of the features described above, or as an alternative, the method includes communicating between the first variable frequency drive and the second variable frequency drive to provide the second variable frequency drive an indication of at least an amount of regenerative energy received by the first variable frequency drive or an amount of regenerative energy to be received by the second variable frequency drive during the second operating condition.

In addition to one or more of the features described above, or as an alternative, the method includes controlling the amount of regenerative energy received by the second variable frequency drive to be less than the amount of regenerative energy received by the first variable frequency drive.

In addition to one or more of the features described above, or as an alternative, the method includes controlling an amount of regenerative power received by the second variable frequency drive according to the indication of the amount of regenerative energy to be received by the second variable frequency drive.

In addition to one or more of the features described above, or as an alternative, the second variable frequency drive determines an amount of regenerative energy to be received by the second variable frequency drive from the first variable frequency drive during the second operating condition.

In addition to one or more of the features described above, or as an alternative, the at least one energy receiving device comprises a energy storage device configured to receive regenerative energy from the second variable frequency drive.

In addition to one or more of the features described above, or as an alternative, the energy storage device comprises a battery.

In addition to one or more of the features described above, or as an alternative, the energy storage device comprises a flywheel.

In addition to one or more of the features described above, or as an alternative, the at least one energy receiving device comprises at least one energy dissipation component.

In addition to one or more of the features described above, or as an alternative, the at least one energy dissipation component comprises a resistive load.

The various features and advantages of at least one disclosed example embodiment will become apparent to those skilled in the art from the following detailed description. The drawings that accompany the detailed description can be briefly described as follows.

DETAILED DESCRIPTION

Figure 1:
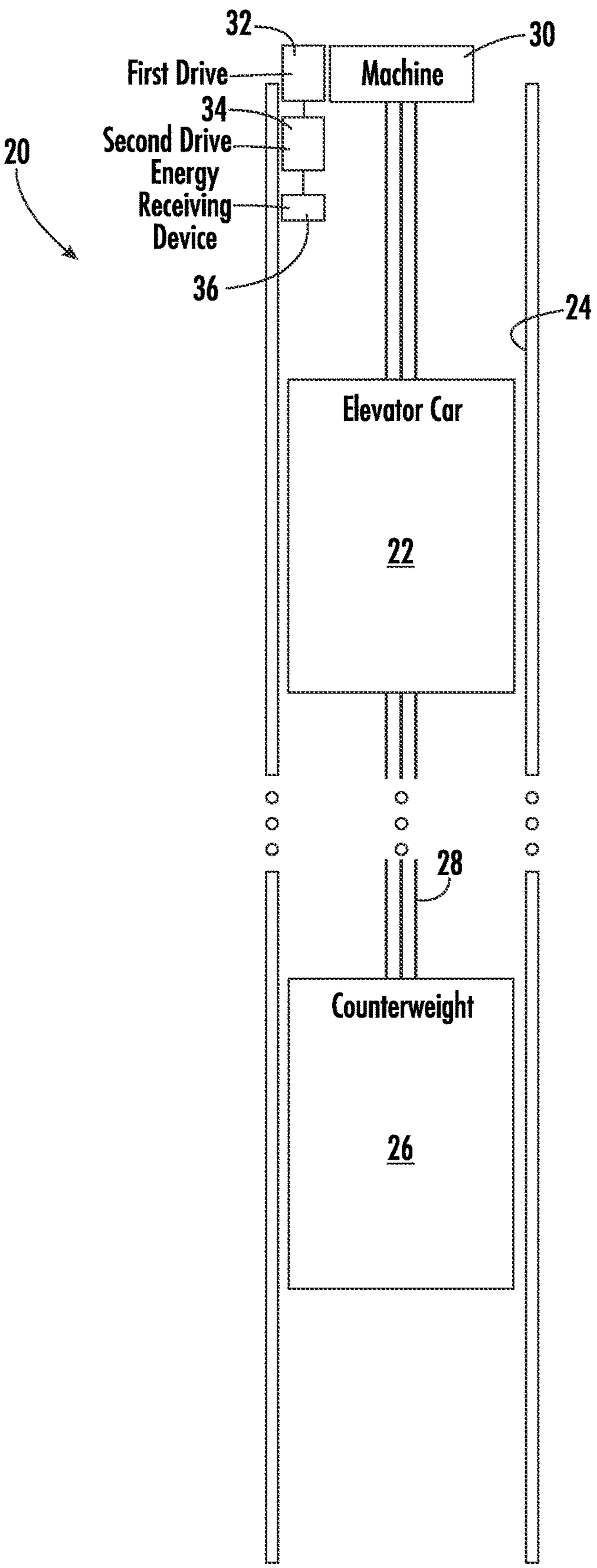
FIG. 1 diagrammatically illustrates selected portions of an example elevator system.

FIG. 1 schematically illustrates selected portions of an elevator system 20. An elevator car 22 moves vertically within a hoistway 24. In the illustrated example embodiment, a counterweight 26 is coupled with the elevator car 22 by elevator roping 28, which may include round ropes or flat belts, for example. While a traction-driven elevator system is shown for discussion purposes, the particular configuration of the elevator system 20 may vary from that which is shown.

An elevator machine 30 controls movement of the elevator car 22. The machine 30 includes a motor to propel the elevator car 22 as needed. The machine 30 also includes a brake that holds the elevator car 22 in a selected position, such as at a landing where passengers desire to enter or exit the elevator car 22.

A first variable frequency drive 32 is configured to deliver electrical power to the machine 30 during a first operating condition in which the motor of the machine 30 requires power for moving the elevator car 22. The first variable frequency drive 32 is also configured to receive regenerative energy from the elevator machine 30 during a second operating condition in which the motor of the machine 30 produces regenerative energy.

For example, the second operating condition occurs during movement of the elevator car 22 that results from taking advantage of gravity. One such example second operating condition includes moving the elevator car upward when the car is empty. Under such conditions, gravity pulls the counterweight 26 down resulting in the elevator car 22 moving upward because the mass of the counterweight 26 is greater than the mass of the empty elevator car 22. In a second operating condition that takes advantage of gravity for moving the elevator car 22, the motor of the elevator machine 30 acts as an electrical generator producing regenerative energy. Another example second operating condition occurs when the elevator decelerates and the motor regenerates electricity due to system mass and inertia. The first variable frequency drive 32 receives such regenerative energy from the elevator machine 30 and is configured to deliver it to the associated electrical grid so it can be used to power other loads, for example.

A second variable frequency drive 34 is configured to selectively receive at least some of the regenerative energy from the first variable frequency drive 32 during the second operating condition. The second operating drive 34 is configured to deliver regenerative energy to at least one energy receiving device 36 that is electrically coupled with the second variable frequency drive 34, such as through conventional wiring.

Figure 2:
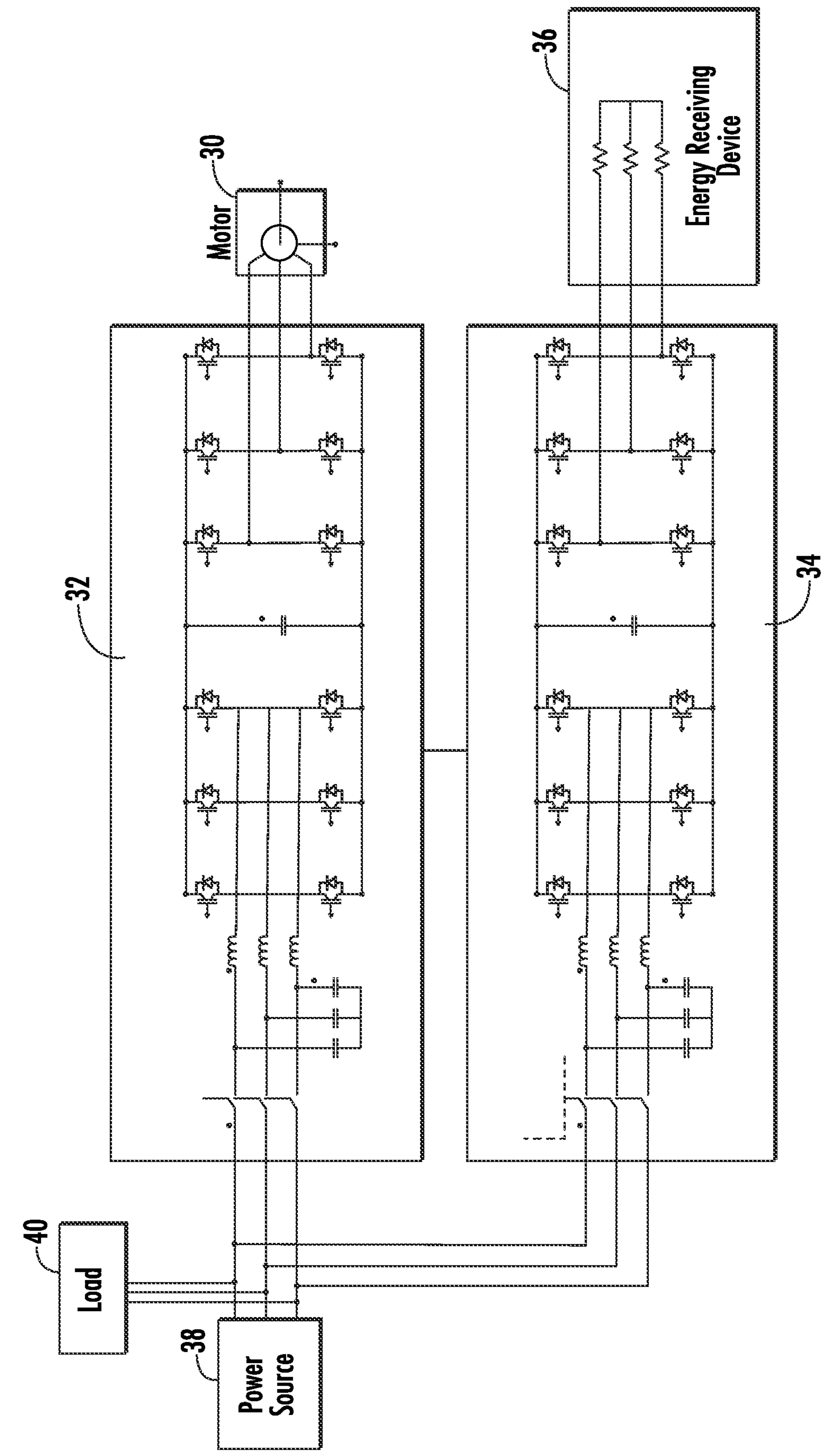
FIG. 2 schematically illustrates an example embodiment of a multiple drive system.
Figure 3:
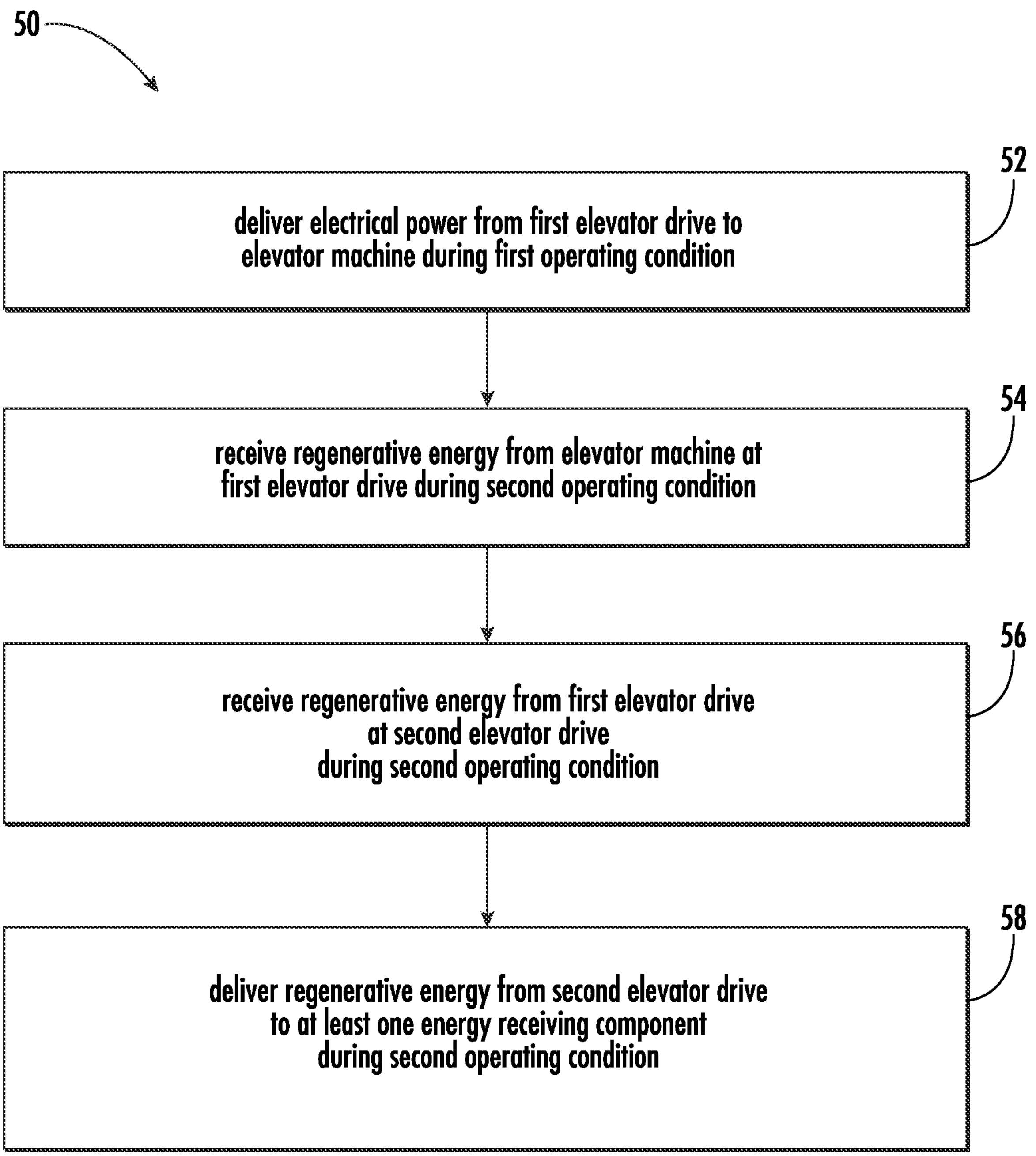
FIG. 3 is a flow chart diagram summarizing an example energy management process.

FIG. 2 schematically illustrates an example configuration of the first variable frequency drive 32 and the second variable frequency drive 34. In this example embodiment, the second variable frequency drive 34 has the same components and arrangement as the first variable frequency drive 32. The example second variable frequency drive 34 is capable of two-way energy reception and delivery. In other embodiments, the second variable frequency drive is configured for one-way energy reception and delivery. The particular components within the second variable frequency drive 34 may be varied to meet the needs of a particular installation.

As shown in FIG. 2, a power source 38, such as a utility grid or a local uninterruptable power supply, provides electrical power that is delivered by the first variable frequency drive 32 to the motor of the elevator machine 30 during the first operating condition, which is when electrical power is needed for moving the elevator car 22. In some embodiments, the power source 38 provides three-phase electrical power. During a second operating condition, such as that mentioned above, in which the first variable frequency drive 32 receives regenerative energy from the elevator machine 30, the system shown in FIG. 2 is configured for managing such energy in an efficient and economical manner.

The second variable frequency drive 34 selectively receives at least some of the regenerative energy from the first variable frequency drive 32. The second variable frequency drive 34 delivers regenerative energy that it receives to the energy receiving device 36. In the example of FIG. 2, the energy receiving device 36 includes at least one energy dissipating component, such as a resistor for absorbing excess regenerative energy in the system. Other configurations of an energy receiving device 36 are included in other embodiments. For example, instead of a three-phase load as schematically shown in the illustration, the energy receiving device 36 can be a single component connected to two of the output phases of the second drive 34 or a component connected between one of the output phases and a DC bus.

In another example embodiment, the energy receiving device 36 has energy storage capability and includes a rechargeable battery, a flywheel, or a supercapacitor. The second variable frequency drive 34 in such embodiments is configured for bi-directional power flow. The energy stored by the energy receiving device 36 may be provided to other portions of the electrical grid including the first variable frequency drive 32 or other portions of elevator system 20 through the second variable frequency drive 34 under appropriate circumstances.

The amount of regenerative energy received by the second variable frequency drive 34 and delivered to the energy receiving device 36 can be selectively controlled to achieve a desired power balance within the overall system. Some of the regenerative energy received by the first variable frequency drive 32 may be fed back to the power source 38 under appropriate circumstances. For example, when the power source 38 is a utility grid that is capable of receiving energy, at least some of the regenerative energy may be delivered to the power source 38. Another load 40, show schematically in FIG. 2, may receive and utilize at least some of the regenerative energy. The load 40 may be another device that is part of the elevator system 20, another elevator, or a device that is located at or near the site of the elevator system 20, such as lighting or a building climate control system. The load 40 may use some of the regenerative energy, store such energy, or absorb it, depending on the configuration of the load 40

The first variable frequency drive 32, the second variable frequency drive 34, or both includes control logic, an application specific integrated circuit (ASIC), or a processor for selectively controlling the amount of regenerative energy received by the second variable frequency drive 34. In one example embodiment, the first variable frequency drive 32 tracks or measures the regenerative power received by the first variable frequency drive 32 and communicates with the second variable frequency drive 34 to provide an indication to the second variable frequency drive 34 to receive regenerative power. In some such embodiments, the second variable frequency drive 34 is responsive to the first variable frequency drive 32 and receives regenerative energy until the first variable frequency drive 32 provides an indication to stop receiving such energy. In other example embodiments, the second variable frequency drive 34 is configured to determine when to receive regenerative energy and how much regenerative energy to receive.

The second variable frequency drive 34 adjusts an amount of regenerative energy that is otherwise within the system to be absorbed by the load 40, the power source 38, or both. Real time communications between the first variable frequency drive 32 and the second variable frequency drive 34 allows for managing where the regenerative energy in the system is delivered to accommodate a variety of second operating conditions and varying amounts of regenerative power produced by the motor of the elevator machine 30.

A one-to-one relationship between the variable frequency drives and an elevator is illustrated and described above for discussion purposes. Other embodiments include drives configured for group control. For example, an embodiment includes a second variable frequency drive 34 configured to receive energy from at least two elevators, which may be in a second operating condition at the same time. Alternatively, group elevator control may be included so that such a second variable frequency drive 34 receives regenerative energy from only one of the elevators at any given time.

The disclosed example embodiment and others like it accommodate the widely varying elevator system power requirements without requiring undesirably expensive resistor load banks to absorb excess energy, for example. An energy management system like that described above accommodates regenerative energy in an effective manner during elevator installation and in situations where there is minimal additional load to which the regenerative energy may otherwise be directed. Controlling the second variable frequency drive 34 to selectively receive regenerative energy from the first variable frequency drive 32 customizes the manner in which regenerative energy is handled within the system in a flexible and economical manner.

The various features of the disclosed example embodiments are not necessarily limited to those embodiments. Other combinations of such features are possible to realize additional or different embodiments.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. An elevator energy management system, comprising:

a first variable frequency drive configured to deliver electrical power from a power source to an elevator machine during a first operating condition and to receive regenerative energy from the elevator machine during a second operating condition that occurs during movement of an elevator car that is coupled to a counterweight;

a second variable frequency drive configured to selectively receive regenerative energy from the first variable frequency drive during the second operating condition, wherein the second variable frequency drive is configured to communicate with the first variable frequency drive to receive an indication of at least an amount of regenerative energy received by the first variable frequency drive or an amount of regenerative energy to be received by the second variable frequency drive during the second operating condition, and wherein the amount of regenerative energy to be received by the second variable frequency drive is less than the amount of regenerative energy received by the first variable frequency drive;

at least one energy receiving device coupled with the second variable frequency drive, the at least one energy receiving device being configured to receive regenerative energy from the second variable frequency drive; and at least one additional load device that receives a portion of the regenerative energy.

2. The elevator energy management system of claim 1, wherein the second variable frequency drive controls an amount of regenerative power received by the second variable frequency drive according to the indication of the amount of regenerative energy to be received by the second variable frequency drive.

3. The elevator energy management system of claim 1, wherein the second variable frequency drive is configured to determine an amount of regenerative energy to be received from the first variable frequency drive during the second operating condition.

4. The elevator energy management system of claim 1, wherein the at least one energy receiving device comprises an energy storage device configured to receive regenerative energy from the second variable frequency drive.

5. The elevator energy management system of claim 4, wherein the energy storage device comprises a battery or a flywheel.

6. The elevator energy management system of claim 1, wherein the at least one energy receiving device comprises at least one energy dissipation component.

7. The elevator energy management system of claim 6, wherein the at least one energy dissipation component comprises a resistive load.

8. The elevator energy management system of claim 1, wherein the second variable frequency drive is configured to selectively deliver electrical power to the first variable frequency drive.

9. A method of managing energy in an elevator system, the method comprising:

delivering electrical power from a power source to an elevator machine through a first variable frequency drive during a first operating condition;

receiving regenerative energy from the elevator machine at the first variable frequency drive during a second operating condition that occurs during movement of an elevator car that is coupled to a counterweight;

receiving at least some of the regenerative energy from the first variable frequency drive at a second variable frequency drive during the second operating condition;

communicating between the first variable frequency drive and the second variable frequency drive to provide the second variable frequency drive an indication of at least an amount of regenerative energy received by the first variable frequency drive or an amount of regenerative energy to be received by the second variable frequency drive during the second operating condition;

controlling the amount of regenerative energy received by the second variable frequency drive to be less than the amount of regenerative energy received by the first variable frequency drive;

delivering regenerative energy received by the second variable frequency drive to at least one energy receiving device coupled with the second variable frequency drive; and delivering a portion of the regenerative energy to at least one additional load device.

10. The method of claim 9, comprising controlling an amount of regenerative power received by the second variable frequency drive according to the indication of the amount of regenerative energy to be received by the second variable frequency drive.

11. The method of claim 9, wherein the second variable frequency drive determines an amount of regenerative energy to be received by the second variable frequency drive from the first variable frequency drive during the second operating condition.

12. The method of claim 9, wherein the at least one energy receiving device comprises an energy storage device configured to receive regenerative energy from the second variable frequency drive.

13. The method of claim 12, wherein the energy storage device comprises a battery or a flywheel.

14. The method of claim 9, wherein the at least one energy receiving device comprises at least one energy dissipation component.

15. The method of claim 14, wherein the at least one energy dissipation component comprises a resistive load.

16. The method of claim 9, comprising selectively delivering electrical power through the second variable frequency drive to the first variable frequency drive.

17. The method of claim 9, wherein the at least one additional load device comprises another building system.

18. The method of claim 9, including using the second variable frequency drive to adjust an amount of regenerative energy that is to be absorbed by the at least one additional load device and the power source.

19. The elevator energy management system of claim 1, wherein the at least one additional load device comprises another building system.

20. The elevator energy management system of claim 1, wherein the second variable frequency drive adjusts an amount of regenerative energy that is to be absorbed by the at least one additional load device and the power source.

21. The elevator energy management system of claim 1, wherein the second variable frequency drive is electrically connected directly to the first variable frequency drive.

22. The elevator energy management system of claim 1, wherein the second variable frequency drive is not connected to the elevator machine and does not control movement of the elevator car.

23. The method of claim 9, wherein the second variable frequency drive is electrically connected directly to the first variable frequency drive.

24. The method of claim 9, wherein the second variable frequency drive is not connected to the elevator machine and does not control movement of the elevator car.

* * * * *